UNITED STATES PATENT OFFICE.

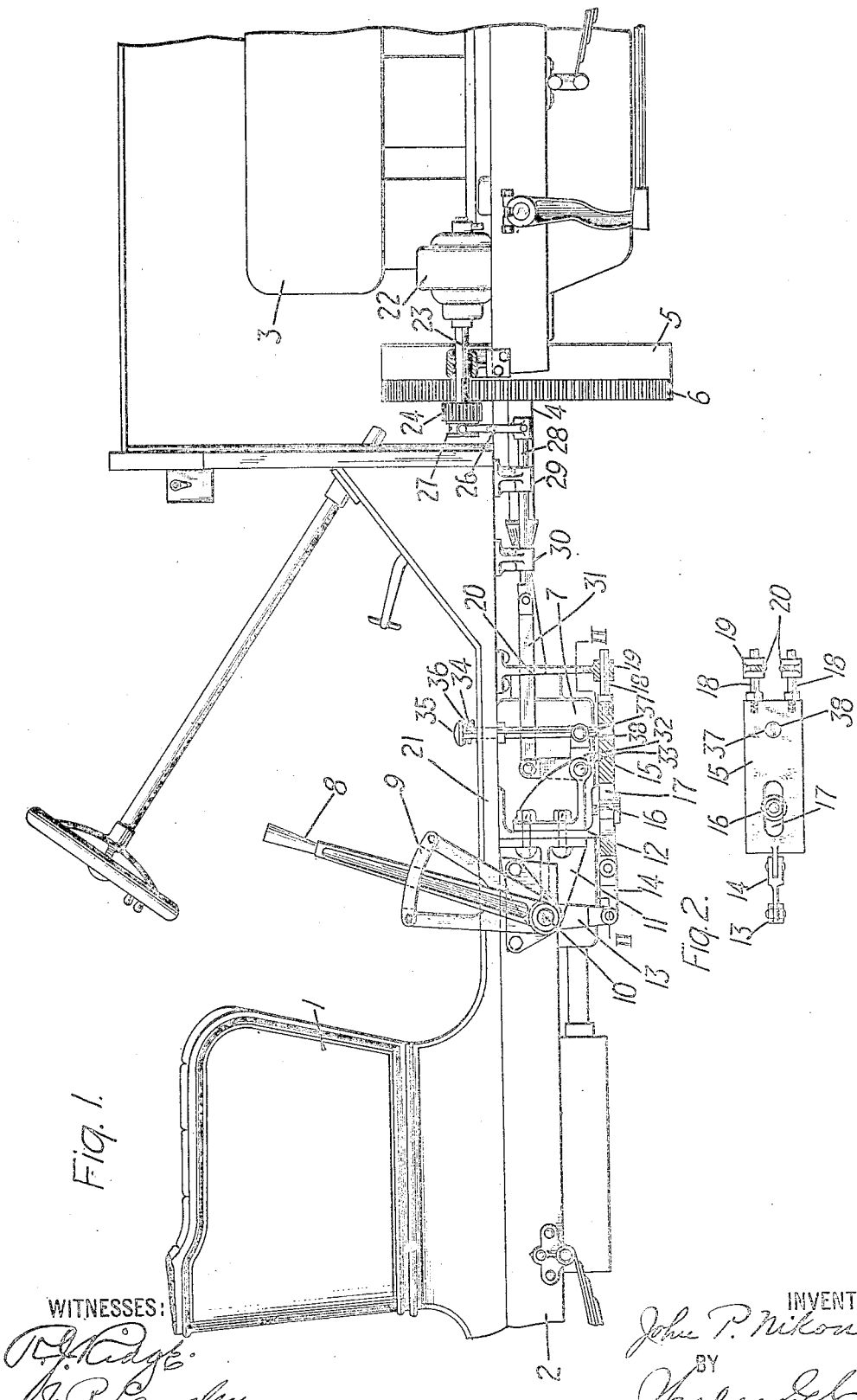

JOHN P. NIKONOW, OF PITTSBURGH, PENNSYLVANIA, ASSIGNOR TO WESTINGHOUSE ELECTRIC AND MANUFACTURING COMPANY, A CORPORATION OF PENNSYLVANIA.

INTERLOCK FOR STARTING MOTORS.

1,231,637.  Specification of Letters Patent.  Patented July 3, 1917.

Application filed January 15, 1913. Serial No. 742,308.

*To all whom it may concern:*

Be it known that I, JOHN P. NIKONOW, a subject of the Czar of Russia, and a resident of Pittsburgh, in the county of Allegheny and State of Pennsylvania, have invented a new and useful Improvement in Interlocks for Starting-Motors, of which the following is a specification.

My invention relates to interlocks for starting motors and particularly to a mechanical connection between the controlling devices for the starting motor and the transmission mechanism of an automobile.

The object of my invention is to provide a small and effective device for preventing the connection or operation of the starting motor while the engine of an automobile or motor vehicle is connected to the driving wheels.

It is a common practice to provide gas engine driven vehicles with suitable starting motors which are, ordinarily, dynamo-electric machines adapted to operate either as motors or as generators. A storage battery supplies the current for the operation of the motor and its capacity is usually such that a large number of starting impulses may be given the engine or, if the transmission gearing is connected, the vehicle may be driven a considerable distance by the power of the electric motor alone. It is possible for the vehicle to be moved in this manner by an unauthorized person without the noise incident to the operation of the engine. It is also possible for the battery to be rapidly discharged in this way by the improper use of the starting motor. In addition, it may happen, through the inadvertence of the operator, that the motor will be held in operative connection with the shaft after the starting of the engine and while the vehicle is being driven. It may also happen that, after the motor has been disconnected, an attempt may be made to mesh the connecting gears while the engine is running at a high speed and the gears will be damaged as a result.

For the above reasons, it is desirable that a means be provided for preventing the simultaneous operation of the motor and the connection of the transmission or the clutch. My invention provides a positive mechanical interlock which will not permit the transmission to be connected when the motor is connected to the engine shaft and will prevent the connection of the starting motor when the transmission is connected.

In the drawings, Figure 1 is a side view, partly in section, of a portion of an automobile with my invention applied thereto. Fig. 2 is a view in section taken on line II—II of Fig. 1.

The automobile 1 comprises the usual frame structure 2, engine 3, engine shaft 4, fly wheel 5 having a gear 6, a gear case 7 for the transmission mechanism and a transmission lever 8 adapted to operate in a guide 9, which may be of the usual H construction and, according to its position therein, to regulate the relative speed of the engine and driving wheels or, in its neutral position, to disconnect the transmission entirely. The transmission lever 8 is connected to a rock shaft 10 supported by the side frame 2 and a bracket 11 bolted to a cross piece 12. One end of a lever 13 is rigidly connected to the rock shaft 10 and the other end is pivotally connected to a link 14 which is pivotally connected to a plate 15 slidably mounted by means of a headed bolt 16 extending through a slot 17, and two pins 18 threaded into one end of the plate 15 and adapted to reciprocate in bearings 19 formed by the bifurcated end of a bracket 20 fastened to the floor 21.

An electric motor 22 is supported in any suitable manner upon the frame 2 and is provided with a shaft 23 upon which is slidably mounted a pinion 24 which is adapted to mesh with the fly wheel gear 6. The pinion is controlled by means of a yoke member 26, which engages a grooved collar 27 attached to the pinion, and which is actuated by a rod 28 mounted to slide in brackets 29 and 30, the rod being connected by a link 31 to one arm of a bell crank 32 pivotally mounted at 33. A rod 34 having a head 35 adapted to be pressed by the foot of the operator against the tension of a spring 36, is connected to the second arm of the bell crank and has an extension 37 which is adapted to register with a hole or recess 38 in the plate 15 when the transmission lever is in the neutral position as shown in Fig. 1.

When the parts are in the position shown in the drawings and it is desired to start the engine, the operator presses on the rod 34, the extension 37 enters the hole 38 and, through the mechanism described above, the pinion is meshed with the fly wheel gear. If the transmission lever is in any other position, the hole 38 in the plate 15 will not register with the rod 34 and the plate will act as a stop for the rod 34 to prevent the meshing of the motor pinion. If, however, the engine has been started in the usual manner and the operator has not removed the pressure from the rod 34, the extension 37 is still in the opening 38 and the operator cannot move the transmission lever until the rod is allowed to return to the position shown. If the engine has been started and the transmission connected, it will be readily understood that it will be impossible for the motor pinion to engage the fly wheel gear while the latter is rotating.

While I have shown and described the interlock as connected to the transmission lever, it may, if desired, be connected to the clutch pedal instead, since the latter also controls the connection between the engine shaft and the driving wheels. While my invention has been described in connection with an electric motor, it may be utilized as effectively in connection with other kinds of motors.

While I have described my invention specifically in its preferred form, it is understood that this form is illustrative only and that such changes may be made as are within the scope of the appended claims.

I claim as my invention:—

1. In combination, an engine shaft, driving mechanism, a transmission lever for controlling the connection between the said mechanism and said shaft, a starting motor, a lever for controlling the connection between the said motor and said shaft, and means whereby the actuation of one of said levers from its inoperative position locks the other of said levers in its inoperative position.

2. In combination, an engine shaft, driving mechanism for a motor vehicle, means for controlling the connection between said engine shaft and said mechanism, a starting motor, means for controlling the connection between said motor and said engine shaft, and a reciprocal interlock between the said controlling means.

3. In combination, an engine shaft, driving mechanism, a transmission lever for controlling the connection between the said mechanism and said shaft, a starting motor, a lever for controlling the connection between the said motor and said shaft, and means whereby the operation of one of said levers prevents the operation of the other of said levers.

4. In combination, an engine shaft, driving mechanism, a transmission lever for controlling the connection between the said mechanism and said shaft, a starting motor, a lever for controlling the connection between the said motor and said shaft, and means whereby the operation of one of said levers prevents the operation of the other of said levers, said means comprising a member connected to one of said levers and having an opening and a member connected to the other of said levers and adapted to register with said opening when the one lever is in an inoperative position.

5. In combination, a transmission lever, a slidable plate member connected thereto and having an opening, a slidably mounted pinion, means for controlling said pinion comprising a pin adapted to register with said opening when the lever is in its neutral position, and a bell crank lever connected to said pin and to said pinion.

6. In combination, a transmission lever, a slidable plate member connected thereto and having an opening therein, a starting motor, a slidable pinion connected thereto, a manually operable pin adapted to register with said opening when the lever is in its neutral position, a lever connected to said pin at an intermediate point and to said pinion.

In testimony whereof, I have hereunto subscribed my name this 9th day of January, 1913.

JOHN P. NIKONOW.

Witnesses:
JOSEPH J. BELL,
B. B. HINES.